2,876,167
Patented Mar. 3, 1959

United States Patent Office

2,876,167

FLUORIDE DENTIFRICE STABILIZED BY A WATER-SOLUBLE ACID PHOSPHATE COMPOUND

Roderick David Manahan, Staten Island, N. Y., assignor to Colgate-Palmolive Company, Jersey City, N. J., a corporation of Delaware No Drawing. Application November 22, 1955
Serial No. 548,550

Claims priority, application Canada November 24, 1954

5 Claims. (Cl. 167—93)

The present invention relates to a dentifrice preparation comprising a fluoride compound which releases fluoride ions in water, a calcium polyphosphate polishing agent, and an agent to render the same more compatible and maintain or produce a marked effectiveness for the care and hygiene of the teeth, as hereinafter described and claimed.

It has been found that dental creams containing calcium pyrophosphate or the like with soluble fluoride material tend to partially lose their effectiveness upon aging. This problem is of particular significance in dentifrices such as a dental cream which contain water or similar solvent material.

In accordance with the present invention, the dentifrice preparation comprises a fluoride compound which releases fluoride ions in water, a calcium polyphosphate polishing material and a water-soluble acid polyphosphate salt to render the mixture more compatible and maintain the effect of the fluoride upon aging. The resulting dentifrice exhibits superior characteristics in comparison to similar preparations which do not possess such added ingredient. It has been found in enamel solubility tests that such mixtures inhibit the solubility of tooth enamel in acid solutions. Such effects are maintained at a comparatively high level even after aging the mixture in an aqueous medium for long periods of time, as compared to mixtures of the fluoride with the polishing agent per se.

The fluoride compound should dissociate or release fluoride ions in water. It is preferred to use the alkali metal or tin fluoride salts. Suitable examples are sodium or potassium fluoride, stannic fluoride, stannous fluoride, stannous chlorofluoride, potassium stannous fluoride, and the like. Other fluoride salts which inhibit the solubility of enamel in acid also and which may be employed are ammonium fluoride, zinc fluoride, copper fluorides such as cuprous fluoride, and the like.

Any essentially water-soluble calcium polyphosphate may be used as the polishing agent, such as a calcium salt of pyrophosphoric, metaphosphoric, triphosphoric acids and the like. Specific examples of suitable materials are calcium pyrophosphate, sodium calcium pyrophosphate, calcium metaphosphate and calcium triphosphate.

Various water-soluble acid polyphosphate salts may be employed in the present invention. Mixtures of any of these agents with a soluble fluoride compound and calcium pyrophosphate in water after 72 hours aging show that a particularly high percent of soluble fluoride or fluoride ion remains in solution as compared to a mixture of the fluoride compound and polishing agent alone. The use of an aqueous slurry of a material from this group with the fluoride and polishing agent to treat tooth enamel tends to inhibit the solubility of the treated enamel in acid solution to a greater degree than results from the mere mixture of the fluoride compound and polishing agent alone.

The water-soluble inorganic acid polyphosphate salts are selected from the group consisting of the partial alkali metal or ammonium salts of pyrophosphoric, tripolyphosphoric, tetraphosphoric acids and the like. Suitable examples are disodium diacid pyrophosphate and dipotassium diacid pyrophosphate. It has been found that aged mixtures of such acid salts with a soluble fluoride compound and calcium pyrophosphate produce a particularly high degree of inhibition in the solubility of tooth enamel in acid solution, and actually tends to enhance the effect of the fluoride compound.

The essential ingredients should be used in suitable proportions. The soluble fluoride compound is employed in a minor but effective and non-toxic amount. It will be used usually within the range of 0.05 to about 1% by weight of the dentifrice composition. The calcium polyphosphate exerts cleansing properties on the teeth. It may be the sole polishing material or it may be admixed with a suitable proportion of other polishing materials. The content of polishing material will be usually from about 20–99% by weight depending upon the specific composition, such as toothpaste or toothpowder. The specified acid polyphosphate salt will be a minor amount, such as up to about 10%, and generally up to 5% by weight. In practice the amount in a dental cream will be usually 0.1–3%, and preferably from 0.2%–2% by weight of the cream.

The dentifrice compositions should contain usually any suitable surface active or detersive material to provide desired detersive, foaming and anti-bacterial properties depending upon the specific type of material. Suitable detergents are water-soluble salts of higher fatty acid monoglyceride monosulfate, higher alkyl sulfate, alkyl aryl sulfonate, higher alkyl sulfoacetate, higher fatty acid ester of 1,2 dihydroxy propane sulfonate, and the like.

It is preferred to use the substantially saturated higher aliphatic acyl amides of lower aliphatic amino carboxylic acid compounds, such as those having 12 to 16 carbons in the acyl radical. The amino acid portion is derived generally from the saturated monoaminocarboxylic acids having about 2 to 6 carbons. These amide compounds are employed in the form of the free acid or the water-soluble salts. Examples are N-lauroyl sarcosine; sodium, potassium and ethanolamine salts of N-lauroyl, myristoyl or palmitoyl sarcosides; sodium N-lauroyl glycine and alanine. They should be substantially free of soap or similar higher fatty acid material which tends to substantially reduce the effect of these compounds. In usual practice, the amount of such higher fatty acid material is less than 15% by weight of the amide and insufficient to substantially adversely affect it, and preferably less than 10% of said amide material.

The use of such amide material in the dentifrice compositions of the present invention is particularly advantageous. The dentifrice composition then exhibits a prolonged and marked effect in the inhibition of acid in the oral cavity due to carbohydrates and a superior antibacterial effect against the oral flora, in addition to exerting a marked reduction in the solubility of tooth enamel in acid solutions.

The various surface active materials should be used in a suitable amount, preferably from about 0.5 to 5% by weight of the dentifrice composition.

The dentifrice should be in a suitable form, such as a toothpaste or a toothpowder. The compositions are prepared in the usual manner.

The dental creams contain liquid material such as water, glycerine, sorbitol, propylene glycol, including suitable mixtures. It is advantageous to use a mixture of both water and a humectant or binder such as glycerine or sorbitol. It is preferred also to use a small amount of a gelling agent such as the natural and synthetic gums, e. g. Irish moss, sodium carboxymethylcellulose, and the like.

Various other materials may be incorporated in the dentrifice preparations. Examples are soluble saccharin, flavoring oils, coloring or whitening agents, preservative, emulsifying agents, silicones, chlorophyll compounds, and the like.

The following specific examples are further illustrative of the present invention. The compositions are prepared in the usual manner and all amounts are by weight:

*Example I.—Dental cream*

|  | Per cent |
|---|---|
| Sodium fluoride | 0.1 |
| Calcium pyrophosphate | 49.8 |
| Disodium diacid pyrophosphate | 1.0 |
| Sodium N-lauroyl sarcoside | 2.0 |
| Glycerine | 29.4 |
| Water | 15.25 |
| Sodium carboxymethylcellulose | 0.85 |
| Soluble saccharin | 0.2 |
| Sodium benzoate | 0.5 |
| Flavor | 0.9 |
|  | 100.00 |

*Example II.—Dental cream*

|  | Per cent |
|---|---|
| Stannous fluoride | 0.2 |
| Calcium pyrophosphate | 49.8 |
| Disodium diacid pyrophosphate | 1.0 |
| Sodium N-lauroyl sarcoside | 2.0 |
| Glycerine | 29.41 |
| Water | 15.29 |
| Sodium carboxymethylcellulose | 0.7 |
| Soluble saccharin | 0.2 |
| Sodium benzoate | 0.5 |
| Flavor | 0.9 |
|  | 100.00 |

*Example III.—Tooth powder*

|  | Per cent |
|---|---|
| Sodium fluoride | 0.2 |
| Calcium pyrophosphate | 84.15 |
| Disodium diacid pyrophosphate | 2.0 |
| Sodium N-lauroyl sarcoside | 4.0 |
| Magnesium silicate | 7.0 |
| Soluble saccharin | 0.15 |
| Flavor | 2.5 |
|  | 100.00 |

Although the present invention has been described with reference to particular embodiments and examples, it will be apparent to those skilled in the art that variations and modifications of this invention can be made and the equivalents can be substituted therefor without departing from the principles and true spirit of the invention.

Having thus described the invention, what is claimed is:

1. A dentifrice preparation comprising about 0.05 to 1% by weight of a water-soluble fluoride compound, at least about 20% by weight of a water insoluble calcium polyphosphate polishing agent, and about 0.1 to 5% by weight of a water-soluble inorganic acid polyphosphate salt selected from the group consisting of the partial alkali metal and ammonium salts of pyrophosphoric, triphosphoric, and tetraphosphoric acids.

2. A dentifrice preparation in accordance with claim 1 wherein said acid polyphosphate salt is disodium diacid pyrophosphate.

3. A dentifrice preparation in accordance with claim 1 wherein said fluoride compound is sodium fluoride.

4. A dentifrice preparation in accordance with claim 1 wherein said fluoride compound is stannous fluoride.

5. A dental cream comprising a liquid vehicle, at least about 20% by weight of calcium pyrophosphate suspended therein, about 0.05 to 1% by weight of a water-soluble inorganic fluoride salt, about 0.5 to 5% by weight of sodium N-lauroyl sarcoside containing less than about 10% of fatty acid material by weight of said sarcoside, and about 0.1 to 3% by weight of disodium diacid pyrophosphate.

References Cited in the file of this patent

UNITED STATES PATENTS

| 2,191,199 | Hall | Feb. 20, 1949 |
| 2,689,170 | King | Sept. 14, 1954 |
| 2,700,012 | Merckel et al. | Jan. 18, 1955 |
| 2,723,217 | Gershon et al. | Nov. 8, 1955 |
| 2,749,278 | Moss | June 5, 1956 |

FOREIGN PATENTS

| 3,034 | Great Britain | Feb. 5, 1915 |
| 490,384 | Great Britain | Aug. 15, 1938 |
| 708,232 | Great Britain | Apr. 28, 1954 |
| 61,409 | Netherlands | July 15, 1948 |

OTHER REFERENCES

MacIntire et al.: Ind. and Eng. Chem., vol. 30, No. 2, February 1938, pp. 160–162.

Current Sci. of India, No. 11, November 1951, pp. 293–294.

Muhler, Ind. State Dent. J., October 1955, pp. 9–19 (pp. 10, 11, 15, and 18 pert.).

Am. Perf. and Ess. Oil Rev., June 1950, p. 459.